US012662918B2

(12) United States Patent
　　Benham

(10) Patent No.:　US 12,662,918 B2
(45) Date of Patent:　Jun. 23, 2026

(54) SYSTEM FOR DYNAMIC OPTIMIZATION OF BACK PRESSURE ON A FLUID WELL

(71) Applicant: ROAM-AI LLC, Oklahoma City, OK (US)

(72) Inventor: David L. Benham, Okarche, OK (US)

(73) Assignee: ROAM-AI LLC, Oklahoma City, OK (US)

( * ) Notice: Subject to any disclaimer, the term of this patent is extended or adjusted under 35 U.S.C. 154(b) by 0 days.

(21) Appl. No.: 19/401,767

(22) Filed: Nov. 26, 2025

(65) Prior Publication Data

US 2026/0078659 A1　　Mar. 19, 2026

Related U.S. Application Data

(63) Continuation of application No. PCT/US2025/017878, filed on Feb. 28, 2025.

(Continued)

(51) Int. Cl.
　　*E21B 43/12*　　　　(2006.01)
　　*E21B 34/02*　　　　(2006.01)
　　(Continued)

(52) U.S. Cl.
　　CPC .......... *E21B 43/128* (2013.01); *E21B 34/025* (2020.05); *E21B 34/066* (2013.01);
　　(Continued)

(58) Field of Classification Search
　　CPC .. E21B 43/128; E21B 34/066; E21B 2200/20; E21B 2200/22
　　See application file for complete search history.

(56) References Cited

U.S. PATENT DOCUMENTS

| | | | | |
|---|---|---|---|---|
| 5,887,657 A | * | 3/1999 | Bussear | .................. E21B 49/08 |
| | | | | 166/336 |
| 11,454,073 B1 | | 9/2022 | Finley et al. | |

(Continued)

FOREIGN PATENT DOCUMENTS

| | | |
|---|---|---|
| WO | WO2021174179 A1 | 9/2021 |
| WO | WO2022159567 A1 | 7/2022 |
| WO | WO 2022/170330 A1 | 8/2022 |

OTHER PUBLICATIONS

Hnot, T., Vasylyshyn, B., Struk, A., Benham, D., Meek, J., and N. Ferrara. "AI-Based Approach for ESP Optimization", Paper presented at the SPE Gulf Coast Section—Electric Submersible Pumps Symposium, The Woodlands, Texas, USA, Oct. 2023 (Paper No. SPE-214731-MS; doi: https://doi.org/10.2118/214731-MS).

*Primary Examiner* — Catherine Loikith
(74) *Attorney, Agent, or Firm* — PEARL COHEN ZEDEK LATZER BARATZ LLP

(57)　　　　　ABSTRACT

On an oil well equipped with an electric submersible pump (ESP), a valve combination coupled with a controller running a machine learning model provides for continuous valve actuator setting adjustment of a back pressure control valve (e.g., valve actuator settings updated at intervals on the order of 100 ms), and/or adjustment of a variable speed drive (VSD), to achieve tight control around a tubing pressure set point for the well. The system for ESP control may be network-connected, e.g. to the Internet, and pump and well data and the external tubing pressure set point may be communicated through the network.

13 Claims, 6 Drawing Sheets

Related U.S. Application Data

(60) Provisional application No. 63/559,611, filed on Feb. 29, 2024.

(51) Int. Cl.
   E21B 34/06       (2006.01)
   G05D 16/20       (2006.01)

(52) U.S. Cl.
   CPC ........ G05D 16/208 (2013.01); *E21B 2200/20* (2020.05); *E21B 2200/22* (2020.05)

(56)                  References Cited

U.S. PATENT DOCUMENTS

| | | | |
|---|---|---|---|
| 12,031,401 B2 * | 7/2024 | Trifol | E21B 43/00 |
| 12,241,345 B2 * | 3/2025 | Gambaretto | E21B 43/128 |
| 2020/0208639 A1 | 7/2020 | Eslinger et al. | |
| 2021/0071509 A1 | 3/2021 | Beck et al. | |
| 2021/0301813 A1 | 9/2021 | Armacanqui et al. | |
| 2021/0333809 A1 | 10/2021 | Greci et al. | |
| 2022/0243568 A1 | 8/2022 | Altammar et al. | |
| 2023/0035369 A1 | 2/2023 | Collins | |
| 2024/0076953 A1 * | 3/2024 | Trifol | E21B 34/025 |

* cited by examiner

SYSTEM FOR DYNAMIC OPTIMIZATION OF BACK PRESSURE ON A FLUID WELL

CROSS REFERENCE TO RELATED APPLICATION

This application is a continuation of International Application No. PCT/US2025/017878, filed Feb. 28, 2025, which claims the benefit of U.S. Provisional Application No. 63/559,611 filed Feb. 29, 2024, both of which are incorporated by reference.

BACKGROUND

The oil and gas industry has undergone advancements in the exploration and extraction of hydrocarbon resources, with drilling, completion, and production operations serving as pivotal stages in the life cycle of a well.

Traditionally, oil and gas extraction involves a sequential process that encompasses drilling, completion, and production phases. During drilling, a wellbore is created through the Earth's subsurface to access hydrocarbon reservoirs. Completion involves the installation of equipment and technologies downhole to facilitate the flow of fluids and ensure the integrity of the well. In the production phase, hydrocarbons are extracted from the reservoir and brought to the surface for further processing.

One critical aspect of maximizing hydrocarbon recovery is the implementation of artificial lift systems, which are designed to overcome the natural decline in reservoir pressure and enhance the flow of fluids to the surface. Electric submersible pump (ESP) systems have emerged as a widely adopted artificial lift technology due to their efficiency in handling various well conditions.

However, existing ESP systems face challenges related to power consumption, control precision, and adaptability to changing downhole conditions. These challenges can impact the overall efficiency of the artificial lift system, leading to increased operational costs and suboptimal hydrocarbon recovery rates.

Proper adjustment and oversight of ESP settings (including pump frequency and tubing pressure) is crucial for maximizing oil production and traditional physics-based and rule-based approaches to ESP optimization generally rely on manual intervention and expert knowledge, which can be time-consuming and may not fully exploit the potential for efficiency improvement.

For example, well nodal analysis is a widely used technique for well optimization in both free-flowing and artificially lifted wells. ESP nodal analysis for production optimization involves modeling the flow network, applying nodal equations to each node, analyzing pressure drops, and optimizing the system. The objective is to maximize production rates, minimize costs, and improve overall efficiency. The process is iterative and requires significant human experience and oversight.

Thus, while ESP nodal analysis offers several benefits, including the ability to optimize system performance, make data-driven decisions, diagnose issues, and adapt to different operational scenarios, the effective implementation of ESP nodal analysis prohibits fully-autonomous or even semi-autonomous operation of the control system.

In a conventional oil well serviced by an ESP lifter, a back pressure control valve may be used to minimize flow instabilities that negatively impact hydrocarbon recovery. The back pressure control valve may be controlled by a conventional proportional-integral-derivative (PID) controller which may dynamically control tubing pressure. However, even computer-assisted selection of gain settings for a PID controller allows for relatively infrequent valve setting adjustment. A controller coupled with logic that provides for valve actuator adjustment continuously (e.g., at intervals on the order of 100 ms) to achieve tight control around a tubing pressure set point has not been fully articulated in theory nor implemented in the field.

Machine learning (ML) and Artificial Intelligence (AI) AI promise advantages when compared to nodal analysis, for predicting control parameters and telemetry output based on historical and well-related data. AI excels in pattern recognition, adaptability, handling nonlinear relationships, scalability, enhanced accuracy, and real-time adaptation. It effectively identifies complex patterns, adjusts to changing conditions, captures nonlinear relationships, processes large datasets, and improves prediction accuracy.

However, the implementation of ML and AI in the oil and gas industry has predominantly remained confined to laboratory and research settings, seldom finding practical usage in oil fields. AI for ESP optimization has received limited attention in academia and open-source initiatives, mostly exclusive to original equipment manufacturers (OEMs), independent software vendors (ISVs), and some operators. Processing the necessary reams of data to obtain appropriate training datasets has proven to be a daunting task.

SUMMARY

Accordingly, there is a need in the art for robust ESP control systems that can operate semi autonomously and fully autonomously, without human intervention, allowing continuous control over relevant process variables to increase and visualize production rates, with appropriate digital interfaces that allow for Internet connectivity and integration of control systems for geographically dispersed well sites.

In one aspect, the invention is a back pressure control valve system between a wellhead of an oil well and a downstream production flowline for controlling fluid flow from the oil well, the system comprising a valve body, an actuator configured for remote control by a controller, an adapter providing connection between the actuator and a lifter, wherein the lifter physically controls the degree open in the valve body in response to signals from the actuator, and wherein the actuator receives control commands continuously setting a back pressure control valve actuator setting that minimizes error around an external back pressure set point determined by a machine learning model.

In embodiments, a programmable logic controller receives the back pressure set point determined by the machine learning model from an edge computing device/cloud connection, receives pressure signals from at least one pressure transducer on the wellhead, and provides the control commands to the actuator.

The programmable logic controller may receive telemetry data indicating pump performance received from sensors in the well, and the telemetry data may be included in the model for providing the control commands to the actuator. The telemetry data may include at least pump frequency information from a variable speed drive for an electronic submersible pump (ESP) in the well and may include well data obtained from a plurality of sensors, said plurality of sensors selected from the group consisting of: ESP run status sensor; ESP downhole current sensor; ESP downhole voltage sensor; DC bus voltage sensor; motor overload sensor; motor current sensor; motor underload sensor; motor voltage sensor; motor power sensor; motor speed sensor; motor temperature sensor; motor torque sensor; intake temperature sensor; intake pressure sensor; casing pressure sensor; discharge pressure sensor; discharge temperature sensor; vertical axis vibration sensor; and horizontal axis vibration sensor.

The programmable logic controller may receive output of machine learning software that includes control commands to the actuator; and the machine learning software may be transmitted to the controller from the network-connected edge computing device. The edge computing device may be configured for Internet connectivity and/or separate programming offline. Logic provided to the controller may be adjusted dynamically and in embodiments may be adjusted autonomously (e.g., the controller logic may be adjusted without operator involvement).

In another aspect, the invention is an electric submersible pump (ESP) control system providing dynamic optimization of back pressure on a fluid well, comprising: an ESP disposed in a wellbore of the fluid well and contacting well fluids thereof; a pump motor disposed in the wellbore configured to mechanically drive the ESP responsive to electrical power provided thereto to lift the well fluids to a surface of the fluid well; a power cable that extends from a surface of the fluid well to the pump motor to provide the electrical power thereto; a drive connected between a power source and the power cable and operable to vary electrical power provided to the pump motor via the power cable; a wellhead at the surface of the fluid well configured to pass well fluids pumped from the fluid well to sales and/or storage via a flowline; an actuated pressure control valve connected between the wellhead and the flowline that is operable to continuously vary a flow rate of the well fluids passing through the flowline; a pressure transducer that transmits pressure signals from the wellhead to a controller for the actuated pressure control valve; wherein the controller is configured to receive a pressure set point determined by a machine learning model; receive pressure signals from a pressure transducer on the wellhead; and control a pressure control valve actuator setting continuously to minimize error around the pressure set point in accordance with the machine learning model. In embodiments, the pressure control valve actuator setting is adjusted automatically more than once per second according to the machine learning model provided to the controller.

In embodiments, the controller is network connected and configured to receive a first machine learning model for optimizing the pressure control valve actuator setting to minimize error around a pressure set point from an external computer. The controller may be configured to receive the pressure set point from an edge computing device configured for network connectivity, and the edge computing device may be configured to run a second machine learning model for optimizing the pressure set point. The edge computing device may be configured for Internet connectivity and offline programming when connectivity is absent.

In embodiments the machine learning logic comprises: a telemetry sub-model using telemetry data obtained from a plurality of sensors in communication with the ESP to produce an actuator setting; and a production sub-model using output from the telemetry sub-model and oil, gas and water production data from the well to produce back pressure set point values.

In embodiments, the plurality of sensors is a plurality selected from the group consisting of: ESP run status sensor; ESP downhole current sensor; ESP downhole voltage sensor; DC bus voltage sensor; motor overload sensor; motor current sensor; motor underload sensor; motor voltage sensor; motor power sensor; motor speed sensor; motor temperature sensor; motor torque sensor; intake temperature sensor; intake pressure sensor; casing pressure sensor; discharge pressure sensor; discharge temperature sensor; vertical axis vibration sensor; and horizontal axis vibration sensor.

The controller may be configured to continuously and autonomously control a valve actuator setting to minimize error around a remotely provided back pressure set point; and the controller may be configured to continuously and autonomously control a variable speed drive (VSD) actuator in communication with the VSD to continuously and autonomously control a set pump frequency; and the pump frequency, the valve actuator setting and signals from the pressure transducer may be provided to an edge computing device.

In another aspect, pump frequency and voltage provided to the VSD to control pump frequency are the control variables and the invention is embodied as an electric submersible pump (ESP) control system providing dynamic optimization of back pressure on a fluid well, comprising: an ESP disposed in a wellbore of the fluid well and contacting well fluids thereof; a pump motor disposed in the wellbore and contacting well fluids thereof, the pump motor being configured to mechanically drive the ESP responsive to electrical power provided thereto to lift the well fluids to a surface of the fluid well; a power cable that extends from a surface of the fluid well to the pump motor to provide the electrical power thereto; a variable speed drive (VSD) connected between a power source and the power cable and operable to vary electrical power provided to the pump motor via the power cable; a wellhead at the surface of the fluid well that is configured to pass well fluids pumped from the fluid well to sales and/or storage via a flowline; an actuated pressure control valve connected between the wellhead and the flowline; a pressure transducer that transmits pressure signals from the wellhead to a controller for the VSD; wherein the controller with logic to continuously minimize error around a backpressure set point is configured to receive a back pressure set point; receive pressure signals from a pressure transducer on the wellhead; and control a VSD frequency setting continuously.

In embodiments, the VSD frequency setting is adjusted automatically according to machine learning logic provided to the controller. As in other configurations, the controller may be network connected and configured to receive a first machine learning model for optimizing the VSD frequency. The controller may be configured to receive the pressure set point from an edge computing device configured for network connectivity, and the edge computing device may be configured to run a machine learning model for optimizing the pressure set point. The ESP system according to any of the embodiments described, wherein the machine learning model includes physical constraint parameters within which the network may optimize the back pressure set point, and the constraints may be programmed manually or automatically adjusted based on data obtained from the well.

Well fluids may comprise oil, water, and gas. And the flow rates of oil, water, and gas may be depicted on an interface.

The back pressure set point may optimized with respect to oil flow rate; gas flow rate; water flow rate; failure rate; downhole amperage; intake pressure drawdown; oil revenue; and/or gas revenue.

In another aspect, the invention is embodied as a method for dynamically optimizing back pressure on a fluid well, the fluid well comprising an electric submersible pump (ESP), a variable speed drive (VSD) controlling the frequency of the pump, and an actuated pressure control valve between the fluid well and a downstream production flowline controlling the degree open of the valve, the method comprising: (a) acquiring pump condition data from a plurality of sensors coupled to the ESP, the pump condition data including operating characteristics indicating pump performance; (b) acquiring production data from a source positioned downstream of the pressure control valve, the production data indicating fluid outflow conditions; (c) inputting the pump condition data into a telemetry layer of a multi-layer machine learning model, wherein the telemetry layer is trained to process operating characteristics of the pump drive; (d) inputting the output of the telemetry layer together with the production data into a production layer of the multi-layer machine learning model, wherein the production layer is trained to process outflow conditions; (e) generating, by the multilayer machine learning model, a back pressure set point; (f) generating, by the multi-layer machine learning model, set point signals for the VSD and the pressure control valve actuator based on outputs from the multi-layer machine learning model based on minimizing error around the backpressure setpoint; (g) adjusting pump frequency and/or valve actuator setting in response to the set point signals; and (h) optimizing the set point signals with respect to fluid outflow according to the machine learning model.

In the method, pump frequency set point and valve actuator set point are adjusted continuously and autonomously. Optimizing maty be with respect to oil flow rate; gas flow rate; water flow rate; failure rate; downhole amperage; intake pressure drawdown; oil revenue; and/or gas revenue.

Pump condition data may be obtained from sensors including a plurality of sensors selected from the group consisting of: ESP run status sensor; ESP downhole current sensor; ESP downhole voltage sensor; DC bus voltage sensor; motor overload sensor; motor current sensor; motor underload sensor; motor voltage sensor; motor power sensor; motor speed sensor; motor temperature sensor; motor torque sensor; intake temperature sensor; intake pressure sensor; casing pressure sensor; discharge pressure sensor; discharge temperature sensor; vertical axis vibration sensor; and horizontal axis vibration sensor.

A training dataset for the machine learning model may comprise discretized historical pump frequency data and discretized historical back pressure data. The method may comprise displaying a back pressure set point value and pressure transducer reading on a graphical display of a human-machine interface. Pump frequency set point and valve actuator set point may be displayed on the graphical display.

In still another aspect, the invention is embodied as a controller configured to control a back pressure control valve actuator for an oil well having an electric submersible pump (ESP) downhole driven by a variable speed drive (VSP), said back pressure control valve being between a wellhead of the oil well and a downstream production flowline, wherein the controller receives pressure signals from a pressure transducer on the wellhead and runs a machine learning model configured to autonomously and continuously update a valve actuator set point for said pressure control valve to minimize error around an external back-pressure set point, wherein said external back-pressure setpoint is provided externally to the controller.

In the controller, the pressure control valve actuator setting may be adjusted automatically more than once per second according to the machine learning logic. The controller may receive pump frequency signals from the variable speed drive (VSD) for the electric submersible pump (ESP) in the well, and wherein the controller is configured to autonomously and continuously update a drive frequency set point to control the voltage supplied to the VSD.

The controller may be configured to simultaneously control the valve actuator set point or the pump frequency set point for a plurality of wells.

In still another aspect, the invention may be embodied as a method for creating a data training set for a machine learning model configured to provide set points for a variable speed drive (VSD) of an electric submersible pump (ESP) and for an actuated pressure valve downstream of the ESP, the method comprising the steps of: (a) acquiring an initial telemetry dataset from a plurality of sensors in communication with the ESP, said telemetry dataset comprising a plurality of data samples selected from the group of features consisting of: ESP run status; ESP downhole current; ESP downhole voltage; DC bus voltage; motor overload; motor current; motor underload; motor voltage; motor power; motor speed; motor temperature; motor torque; intake temperature; intake pressure; discharge temperature; discharge temperature vertical axis vibration; and horizontal axis vibration; and casing pressure; and including at least pump frequency and back pressure; (b) identifying and removing erroneous or low-quality data samples within the initial telemetry dataset by outlier detection; and invalid value detection; and missing data thresholds to form a partially cleaned dataset; (c) normalizing the values of the partially cleaned dataset so that the mean of each feature is 0 and the standard deviation is 1 to form a cleaned dataset; and (d) storing or transmitting the cleaned dataset for subsequent training of the machine learning model.

The method may involve discretizing historical back pressure data and discretized pump frequency data and cleaned discretized data may be retained on a non-transitory computer readable medium.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

As discussed in the Background section above, existing ESP systems face challenges related to power consumption, control precision, and adaptability to changing downhole conditions. These challenges can impact the overall efficiency of the artificial lift system, leading to increased operational costs and suboptimal hydrocarbon recovery rates.

Figure 1:
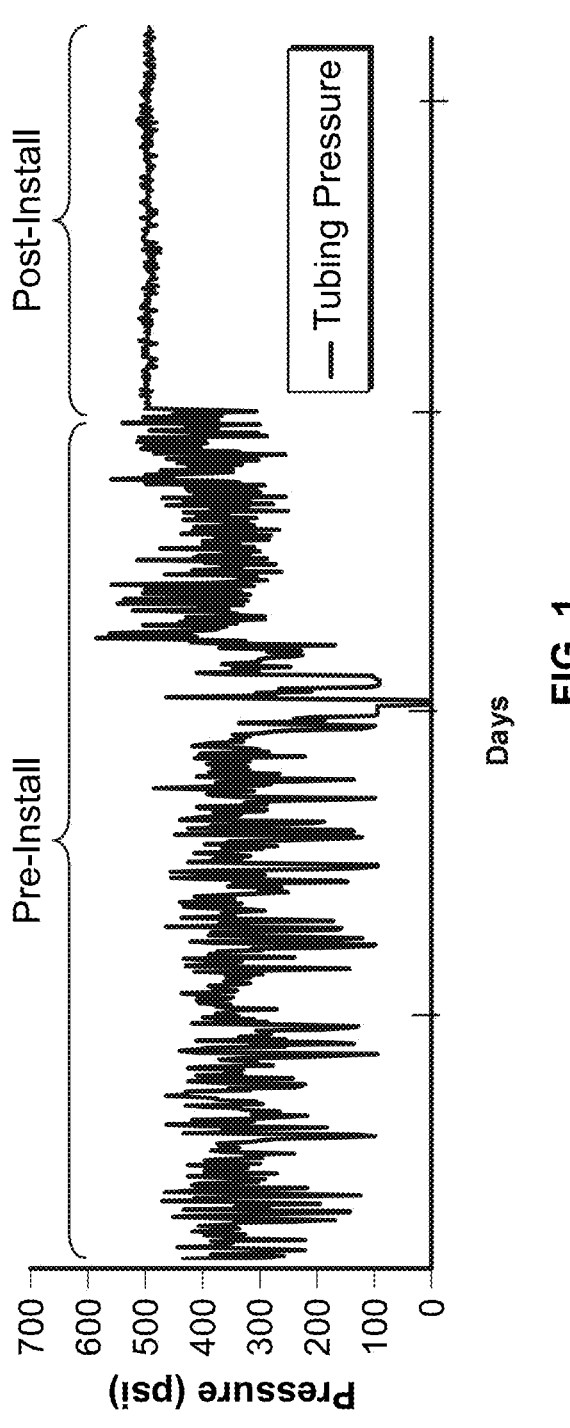
FIG. 1 is a plot of a real-world oil well performance, showing variation of tubing back pressure around a set point, before and after installation of an improved back pressure control valve system incorporating machine learning optimization according to an embodiment of the invention.

The ability of an ESP control system according to the invention to control tubing pressure around a setpoint using continuous control of an actuated back pressure valve is captured graphically in FIG. 1, which shows variation of back pressure around a set point for a real world oil well using a controller for setting the valve actuator, before and after installation of the improved back pressure control valve system incorporating machine learning optimization according to the invention. In general, as used herein, "pressure set point" and "back pressure set point" have the same meaning and refer to the tubing pressure controlled by the back pressure control valve.

The downhole components of an ESP system according to embodiments of the invention include a pump 511, the downhole motor, an intake and a discharge. The pump is located downhole and is responsible for lifting the fluids, which generally comprise oil, water, and gas, to the surface. In an embodiment, the pump comprises a multistage centrifugal pump designed to handle the specific well conditions, although this is an example only and is not intended to be limiting. The downhole motor is a motor that converts electrical power into mechanical power to drive the pump. In an embodiment, the downhole motor comprises a three-phase induction motor, although this is an example only and is not intended to be limiting. The downhole motor may be partially or completely submerged in the well fluid. The intake is a component that is located at the bottom of the pump and that allows the well fluids to enter the pump. The discharge is a component through which the pump discharges the fluid at a higher pressure than the intake, helping to lift the fluid to the surface. The aforementioned components may be connected on site with electrical power, data cables, and telemetry in various ways.

The back pressure control system according to embodiments herein comprises an actuated pressure control valve, which may be located near the wellhead above ground on a tubing or casing line upstream of separation equipment, remotely adjusted as directed by the controller. In embodiments, the pressure control valve does not require human intervention to restrict flow and create upstream back pressure and may be operated autonomously or semi-autonomously via controller 402. In an embodiment, the automated back pressure valve is comprised of: (a) an actuator adaptor; (b) an adaptor assembly; (c) an actuator; (d) a back pressure control device or "lifter"; and (e) a programmable logic controller 402 enabled with a machine learning model capable of regulating pressure via the back pressure control device at the wellhead within a narrow operating window. Instantaneous pressure on the well head is obtained by (f) a pressure transducer and transmitted to the controller. A human machine interface may provide a display of the current pressure and the pressure set point and allow for the set point to be input manually.

Figure 5:
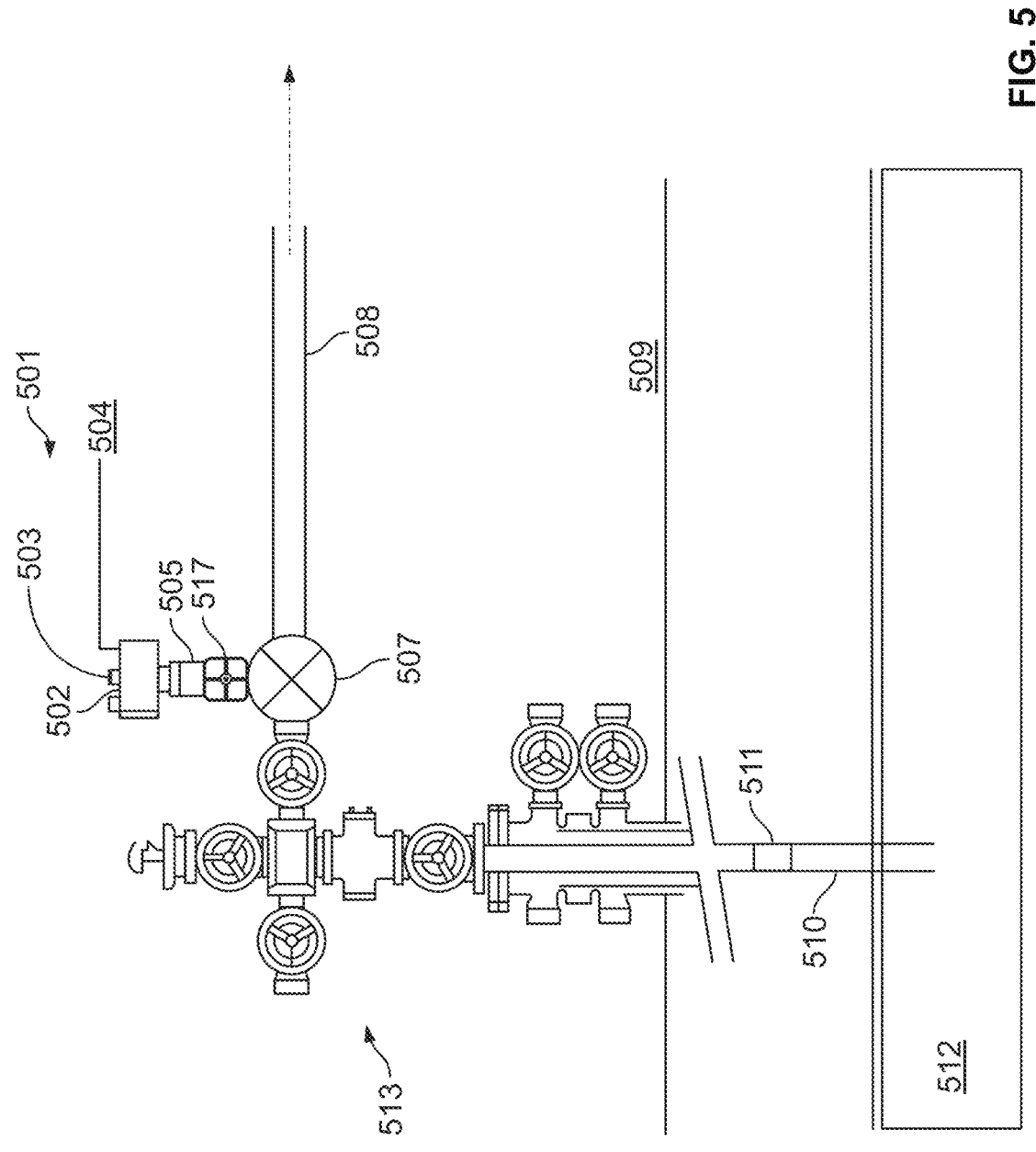
FIG. 5 schematically depicts an oil well and wellhead structure including an actuated valve of an ESP system in accordance with embodiments of the invention.

The components of an ESP system for controlling tubing pressure according to embodiments of the invention are depicted in the schematic of FIG. 5. Well fluids flow from oil reservoir 512 through tubing or casing 510 to wellhead 513 at surface 509 with the aid of ESP 511. As shown in FIG. 5, pressure control valve system 501 is located between the wellhead 513 and downstream production flowline 508. The valve system itself comprises valve body 507, actuator circuitry contained within actuator 502, powered by power source 503, and provided with logic 504 from a programmable logic controller configured for remote control. Adapter 505 provides connection between actuator 502 and lifter 517, which physically controls the degree open in valve body 507 upon signals from actuator circuitry. Actuator 502 receives control commands 504 setting a pressure control valve setting, continuously minimizing error around an external back pressure set point. In this context, as used herein, "continuously" means at frequent intervals, e.g., less than 10 seconds, less than 1 second, and in embodiments, 100 ms or less. In implemented embodiments according to the invention, a valve actuator set point and corresponding valve actuator setting is adjusted at time increments of 80 ms. Smaller time increments may be feasible. In this context "external" back pressure set point means that the set point may be computed externally of the controller, for example on another computer such as an edge computing device running a machine learning algorithm, or the set point may be manually input by an operator, provided the programming allows for continuous control of the valve actuator.

Figure 4:
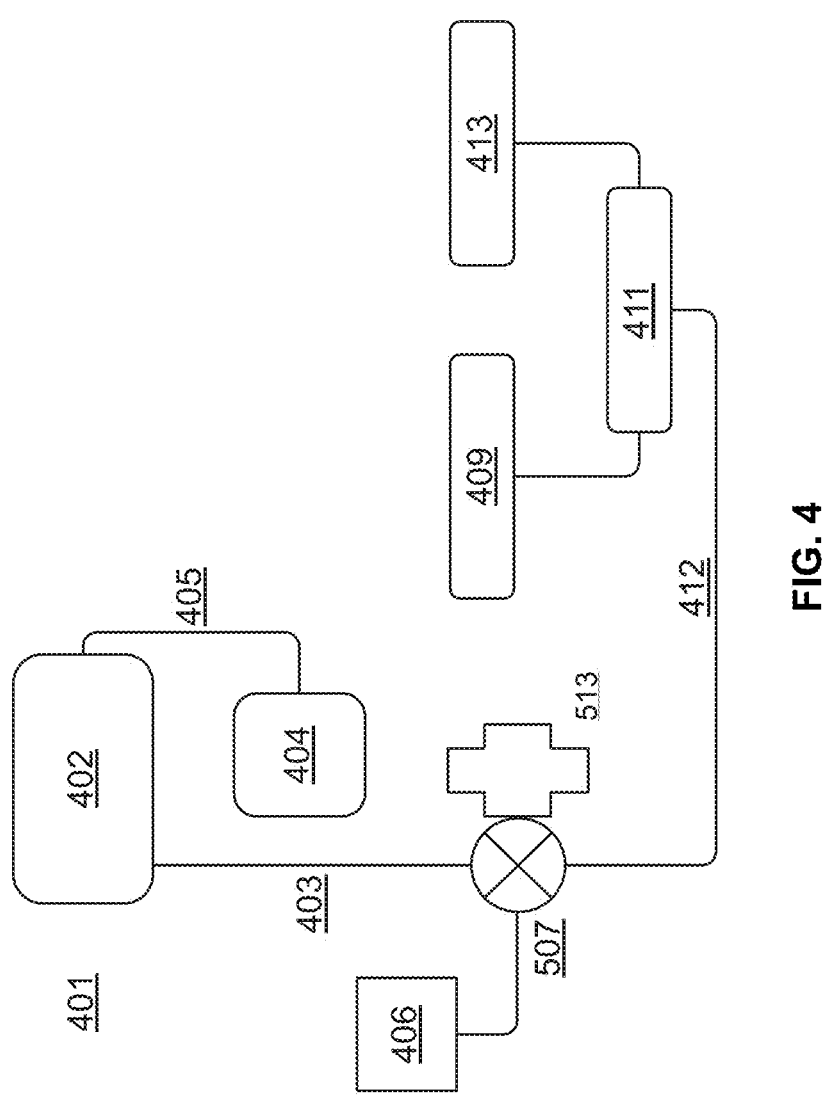
FIG. 4 is a diagram of an ESP control system according to embodiments of the invention.

In the schematic of FIG. 4, actuated valve 507 is shown in combination with ESP system 401. According to embodiments of the invention, actuated valve 507 is powered by power source 406 and is in communication with a programmable logic controller (PLC) 402. PLC 402 receives pressure signals from a pressure transducer on the wellhead and, according to program input, generates control commands for actuated valve 507 to minimize error around a back pressure set point as shown in FIG. 1 ("tubing pressure" and "back pressure" are used synonymously herein). VSD 404 is a component that adjusts the voltage of the electrical power supplied to the downhole motor of ESP 511. This allows for precise control of pump speed (frequency, expressed in Hz) and enhances system efficiency. In embodiments, controller 402 comprises a unit that controls operation of the downhole pump motor. It regulates the power supplied to the motor based on the desired pump speed and downhole conditions. The controller also houses novel software to control the VSD and well back pressure. In addition, or alternatively, PLC 402 may be adapted to vary the power provided to variable speed drive (VSD) 404 of ESP 511 continuously (e.g., at similar increments of time, on the order of 100 ms or 80 ms) in tandem with control of the valve 507. Pump frequency may be used like the valve actuator setting to keep tight tolerances around the tubing pressure set point and the frequency and valve actuator setting may be controlled in tandem according to machine learning logic to improve power usage. Data from VSD and valve actuator may be transmitted to an external computer, such as an edge computing device, via controller 402 and switch 605.

Referring again to FIG. 4, wellhead 513 connects downhole equipment (e.g. ESP 511) to piping 412 at surface to flowlines and valves for transporting hydrocarbons and water to separation 411, gas sales 409, and/or storage 413. Controller 402 receives data 403 from a pressure transducer on the wellhead 513 and logic input to provide valve actuator settings to actuated valve 407, which operates in a manner to control back pressure on the well by restricting the flow of hydrocarbons and/or water. Software at controller 402 dynamically adjusts valve 507 via an actuator to maintain a tight tolerance of pressure observed on the pressure transducer on the wellhead. Alternatively, or in addition (e.g. simultaneously), controller 402 may control variable speed drive (VSD) 404 to target an optimal drive frequency and, in turn, control the drive speed of the ESP downhole. In embodiments, controller 402 controls both valve 407 and VSD to maintain backpressure within a tight tolerance around a back pressure set point.

In embodiments, a plurality of sensors (not shown) comprising a plurality selected from the group consisting of ESP run status sensor; ESP downhole current sensor; ESP downhole voltage sensor; DC bus voltage sensor; motor overload sensor; motor current sensor; motor underload sensor; motor voltage sensor; motor power sensor; motor speed sensor; motor temperature sensor; motor torque sensor; intake temperature sensor; intake pressure sensor; casing pressure sensor; discharge pressure sensor; discharge temperature sensor; vertical axis vibration sensor; and horizontal axis vibration sensor may output a plurality of signals to the controller. Data relating to downhole condition of the well and/or the pump may be dynamically included in the machine learning model.to provide output for the controller.

Figure 6:
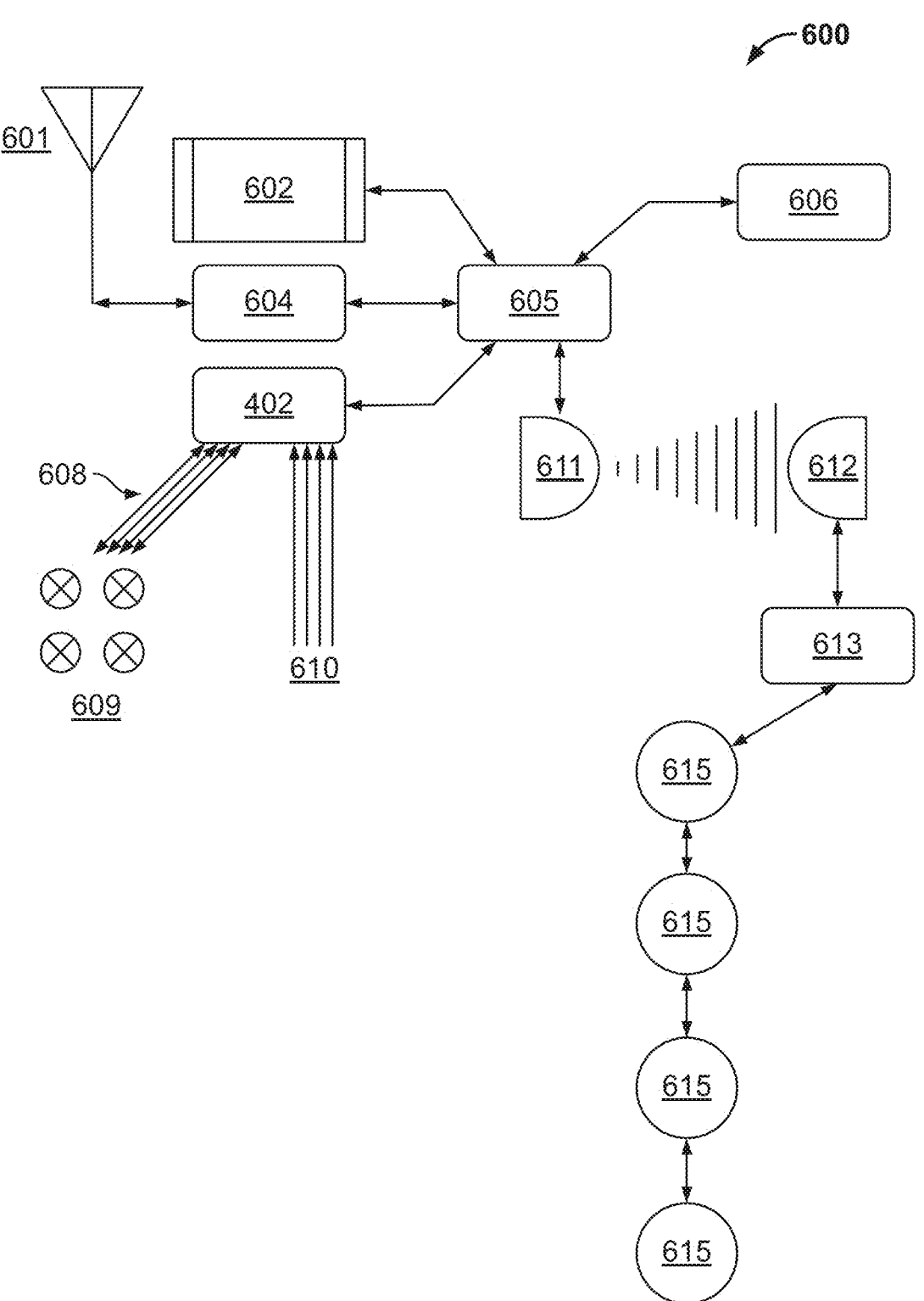
FIG. 6 is a diagram of a control system for an ESP according to embodiments of the invention including network connections and edge computing hardware.

FIG. 6 depicts a network system 600 for controlling and optimizing one or more back pressure valves 609 and/or one or more corresponding ESP variable speed drives 615 which may be implemented at geographically distributed sites for collection of data and control of ESP parameters (e.g. drive frequency and valve pressure actuator set point) while ensuring continuous well operation, even in the absence of Cloud connectivity. A plurality of VSDs 615 may communicate with each other and with system 600 using a serial communication standard 613 such as RS485. The network of VSDs may communicate with the system 600 wirelessly via a wireless bridge 611, 612 receiving commands and transmitting data to the system via Ethernet switch 605. As used herein, "network" includes both wired and wireless networks.

Localized edge computing node(s) 606 provides real-time control and data processing at the edge. Edge device or node 606 may replace or supplement traditional on-site systems with advanced analytics and AI-driven decision-making and may operate autonomously in case of network failure. Ethernet switch 605 relays data and commands to and from node 606 throughout the system and may provide software logic from the Internet to edge node 606 and controller 402.

Each edge node 606 collects telemetry data from sensors, actuators, and controllers (e.g., at the site(s)) and may implement and update AI/ML algorithms that are processed by controller(s) 402. Sensor output provided to edge node 606 may include output from ESP run status sensor; ESP downhole current sensor; ESP downhole voltage sensor; DC bus voltage sensor; motor overload sensor; motor current sensor; motor underload sensor; motor voltage sensor; motor power sensor; motor speed sensor; motor temperature sensor; motor torque sensor; intake temperature sensor; intake pressure sensor; casing pressure sensor; discharge pressure sensor; discharge temperature sensor; vertical axis vibration sensor; and horizontal axis vibration sensor. When the node(s) 606 lack connectivity to the Cloud, data may be stored and batch-transferred to the Cloud when connectivity is restored. While each site operates independently, when connectivity is available, the system synchronizes securely with the Cloud or data center. In embodiments, a machine learning algorithm optimized to control back pressure valve actuator set point may dynamically update on controller 402. In embodiments, the algorithm is optimized to control both valve actuator set point and VSD drive frequency. Communication with the Cloud may be completed via Internet connection through conventional systems, such as cellular antenna 601 and virtual private network (VPN) communicating with system via router 604 and switch 605. Programmable Logic Controller 402 receives data from pressure transducers 610 and may provide an analog valve actuator set point setting 608.

The control panel comprises equipment that enables operators to monitor and control the ESP system. The control panel may include a Human-Machine Interface (HMI) 602 for setting parameters and receiving real-time data. Power cable 405 is used to supply power to the downhole pump motor. It runs from the downhole pump motor down the wellbore and connects to the surface equipment. A surface feedthrough provides a sealed connection point for the cable to pass through the wellhead.

Unless specifically stated otherwise, as apparent from the following discussions, it is appreciated that throughout the specification discussions utilizing terms such as "processing", "computing", "calculating", "determining", "deriving" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. The "Cloud" refers to remote Internet-based computing resources which may include data storage and computation that provides software models to geographically distributed sites.

Figure 3:
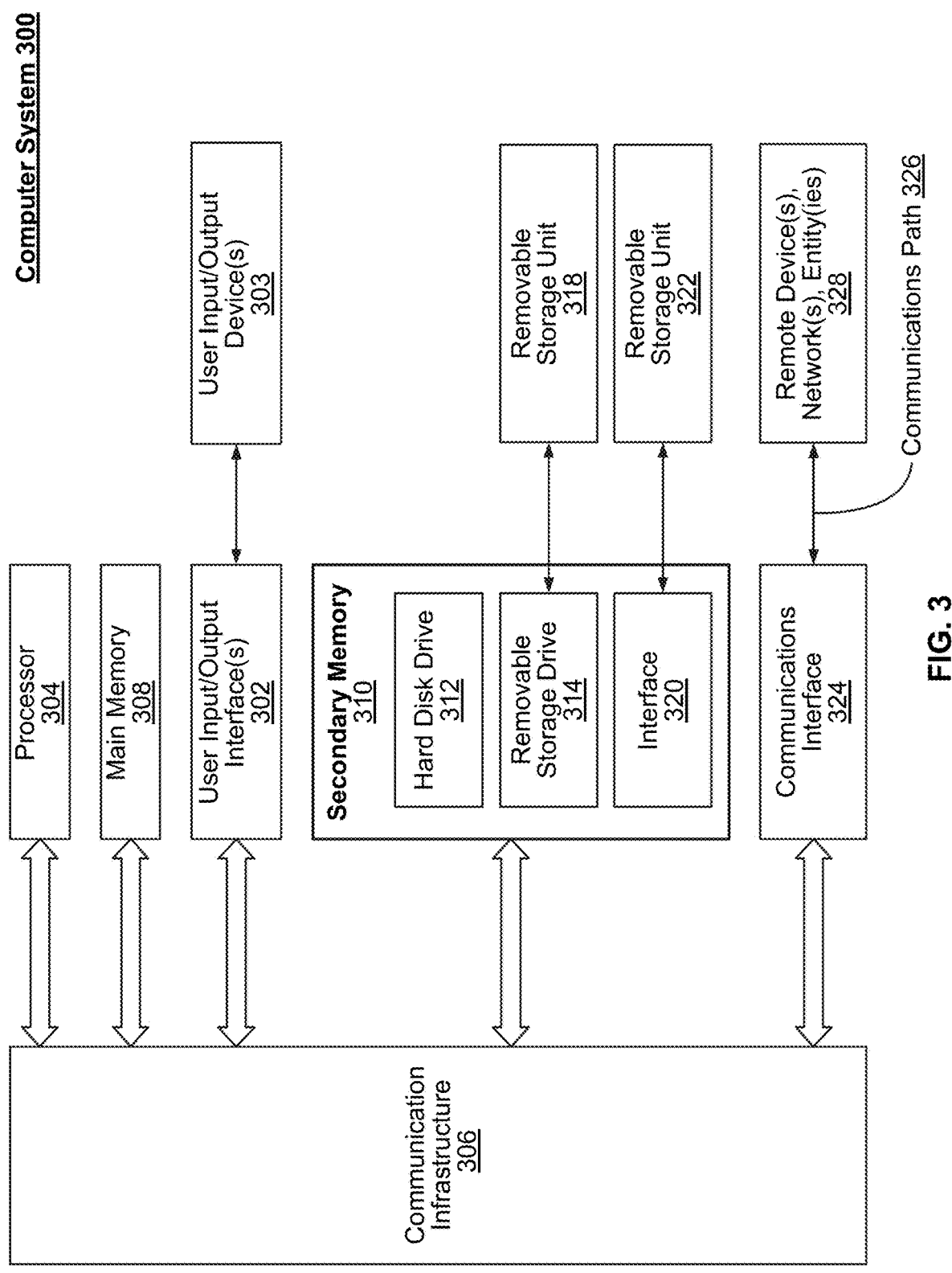
FIG. 3 depicts an example computer system that may be used to implement various embodiments of the invention.

Software components described herein may be executed, for example, using one or more well-known computer systems, such as computer system 300 shown in FIG. 3. A conventional PID controller or PLC may have the structures described in connection with FIG. 3. An edge computing device, likewise, may comprise these structures.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 414 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of removable storage unit 322 and interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed Cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system

300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

In embodiments herein, the software may comprise a neural network, employed to process input data and generate one or more output signals or classifications. The neural network can comprise a plurality of interconnected nodes (sometimes referred to as neurons or units) arranged in one or more layers. Each node in a layer may receive one or more inputs (e.g., from external data sources or from previous layers) and may generate an output based on a weighted combination of these inputs and an activation function. By way of example, each node ii in a layer may be associated with a set of parameters, such as weights $wi,jw\_\{i,j\}$ and a bias $bib\_i$, which collectively define how the node processes incoming signals.

During training, the neural network parameters (e.g., weights and biases) are iteratively adjusted according to a learning rule or optimization process. Such training may include backpropagation or other gradient-based methods that minimize a cost function indicative of the difference between a desired output and an actual output produced by the network. In certain embodiments, the cost function measures error over a set of training examples. Upon convergence, the trained network parameters allow the neural network to approximate a desired function or mapping from the input domain to the output domain.

In embodiments herein, data for training is obtained from the well where the ESP system and software control are installed. The training data may include historical telemetry data relating to the condition of the ESP and may include, for example, ESP run status; ESP downhole current; ESP downhole voltage; frequency; DC bus voltage; motor overload; motor current; motor underload; motor voltage; motor power; motor speed; motor temperature; motor torque; intake temperature; intake pressure; casing pressure; tubing pressure; and vibration. Another part of the dataset includes additional production and feature statistics that describe well characteristics, such as well age, peak production rates, and theoretical production rates. Data preparation, which is used to formulate weights and biases may involve removing outliers using 1st and 99th percentile filters, eliminating periods when a well was shut off or on maintenance (e.g., using "Run Status" values), and filling in missing telemetry or flowmeter values, for example plain forward filling in when a feature is missing for a period of time and regression analytics when a feature such as motor speed or motor torque is completely missing.

Even though frequency and tubing pressure are continuous variables, the controls domain of the model was discretized in steps of $\pm 1$ Hz and $\pm 10$ psi, respectively. This not only accommodates physical wellhead restrictions of minimum tubing pressure or frequency changes but also simplifies the optimization problem by switching from a continuous to a discrete one.

The neural network architecture may vary. For instance, the network may be a feed-forward network (where connections do not fonm cycles), a recurrent neural network (where outputs of certain nodes feedback as inputs to nodes in the same or previous layers), or a convolutional neural network (employing convolution filters to extract features from spatial or temporal data). In any of these configurations, additional layers (often called "hidden layers") can be employed to enable the network to learn complex, nonlinear relationships in the input data.

In operation, once trained, the neural network receives raw or preprocessed data as input. Each layer transforms the data in turn, ultimately producing an output that may represent, for example, a classification score, a numerical prediction, or some other computed quantity, for example a set point. The neural network may operate autonomously or semi-autonomously, in real time or near real time, continuously adapting or retraining based on new data, thereby improving or modifying its performance over time.

In an embodiment, software delivered to or embedded within an on-site equipment controller or edge computing device runs an artificial neural network (ANN) and/or machine learning model to dynamically and autonomously adjust tubing pressure via the pressure control valve and/or pump speed via the VSD. In another aspect, the ANN may comprise a model that predicts an optimal back pressure set point, which may be used to update the back pressure set point on the controller. This model may utilize historical telemetry data recording the performance of the ESP and historical production data recording the flow rates of gas, oil and water from the well for training. In embodiments, logic provided to the controller is updated dynamically in response to current telemetry data or production data.

The ANN may comprise layers of nodes, such that an information output of one layer serves as input to a next layer. As discussed above, the ANN model may be trained on historical data obtained from operation of one or more wells, which data are processed or "cleaned" using techniques disclosed herein. This data may comprise telemetry data (e.g., pump information obtained from pump sensors) and production data (e.g., flow rates of gas, oil and water from the well).

Figure 2:
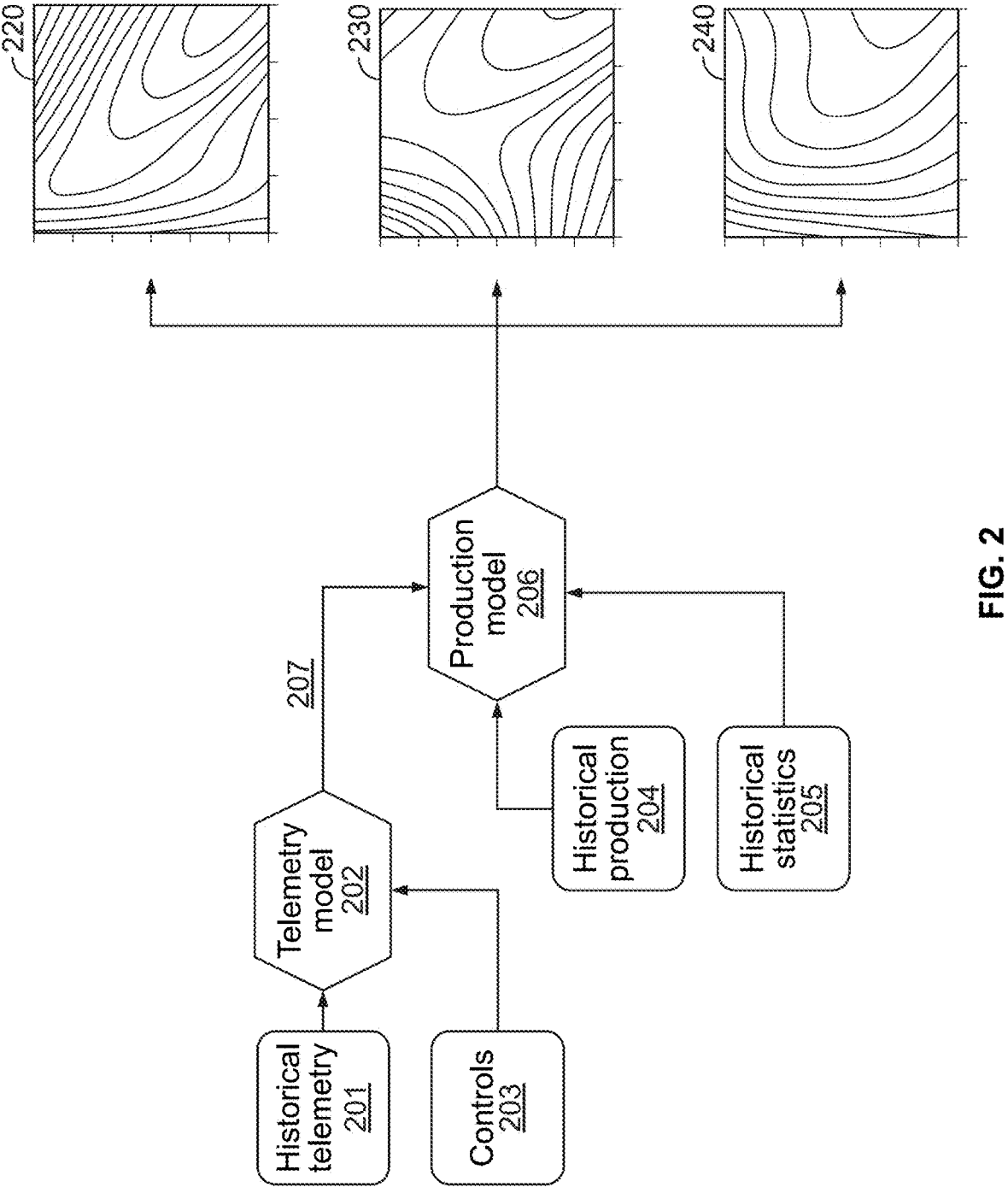
FIG. 2 is a schematic depiction of an algorithm that may run on a controller or edge computing device to control a back pressure valve actuator setting and/or pump frequency to optimize well production according to embodiments of the invention.

As seen in the schematic machine learning model architecture diagram of FIG. 2, the model may comprise telemetry sub-model 202 and production sub-model 206. Telemetry sub-model 202 may be trained separately on historical telemetry data 201 from a given well. Target values for the telemetry model 202 are future telemetry values. Telemetry data 201 may relate to the condition of the ESP and may include, for example, ESP run status; ESP downhole current; ESP downhole voltage; frequency; DC bus voltage; motor overload; motor current; motor underload; motor voltage; motor power; motor speed; motor temperature; motor torque; intake temperature; intake pressure; casing pressure; tubing pressure; and vibration. Output 207 from telemetry model 202 may be input for the controller to determine valve actuator set point near-continuously as discussed above. The control variable settings 203 provided to the telemetry model may include tubing pressure and pump frequency, in addition to historical tubing pressure and pump frequency data, and historical gas, water and oil flow rates from the well that may be provided to telemetry sub-model 202. For example only, a suitable telemetry sub-model 202 may be trained using a data set obtained from a full set of historical pump condition data, and the model may provide biases for adapting the settings on controller 402, but controller 402 itself may control only valve actuator settings or only pump frequency settings, or a combination of them.

Alternatively, or in addition, output 207 from telemetry sub-model is input into production sub-model 206. Production sub-model 206 is built on top of the telemetry model and takes two additional input groups, historical production 204, and historical well statistics 205. This sub-model may consist, for example, of two structural parts, the convolution part before concatenation with the telemetry sub-model 202 and a deep nonlinear part which consists of five dense layers with sigmoid activations. Target values for the production model may be future oil flow rate 220, water flow rate 230, and gas flow rate 240. Flow rates 220, 230, and 240 may be mapped graphically as a function of tubing pressure and frequency, wherein each of the bands represents a specific flow rate of oil, water and gas over a range of tubing pressure and pump frequency.

The machine learning model used in the ESP system introduces a constraint-based optimization framework to ensure that setpoint predictions remain within physically defined operational boundaries. This framework consists of two key components: VSD setpoint optimization and backpressure control optimization. The VSD optimization mechanism constrains frequency adjustments within predefined safety and performance limits, allowing the system to adaptively tune ESP performance while maintaining operational stability. These constraints can be established manually or updated dynamically based on real-time telemetry data, including tubing pressure, pump frequency, and production flow rates. Similarly, the backpressure control optimization applies physical constraints directly to the predictions made by the telemetry model, ensuring that the optimized backpressure setpoints remain within defined boundaries. These constraints may be manually set based on historical operational limits or adjusted dynamically in response to real-time well data. By embedding these constraints into the telemetry model, the system enhances control accuracy, improves production stability, and safeguards against operational risks. This dual-layered approach ensures that optimization decisions align with physical system limitations while continuously refining performance based on real-time telemetry inputs.

A technique that may be utilized to obtain a suitable machine learning algorithm based on a neural network may be found in: Hnot, T., Vasylyshyn, B., Struk, A., Benham, D., Meek, J., and N. Ferrara. "AI-Based Approach for ESP Optimization", Paper presented at the SPE Gulf Coast Section—Electric Submersible Pumps Symposium, The Woodlands, Texas, USA, October 2023 (Paper No. SPE-214731-MS; doi: https://doi.org/10.2118/214731-MS), the entirety of which is incorporated by reference herein.

This algorithm may sequentially or concurrently optimize other conditions (e.g., other than oil production) such as lease operating expense, equipment run life, estimated ultimate recovery, etc. The optimization algorithm sends a set point to the onsite equipment via the controller which is relayed to the automated back pressure valve via CAT5, Ethernet, or other suitable communication 605. The controller adjusts back pressure automatically creating a corresponding change in the well's bottom hole flowing conditions. This change in bottom hole flowing conditions results in an increase or decrease of fluids at the surface.

An important advantage of artificial intelligence (AI) modulated control of pump frequency and valve pressure according to the embodiments described herein is that semi-autonomous and autonomous optimized operation of one or more wells may be achieved across geographically distant sites.

A first machine learning model may operate on the system to optimize pump performance at one or more well sites by controlling a valve actuator to minimize error around a valve actuator pressure set point and/or by controlling a power supplied to a variable speed drive to control pump frequency around a pump frequency set point. The first model operates on telemetry data indicative of ESP performance. Such data have complex interactions, and the first model allows for adjustment of the valve actuator set point and/or drive frequency set point continuously. In this context, "continuously" means at frequent intervals, e.g., less than 10 seconds, less than 1 second, and in embodiments, 100 ms or less. In implemented embodiments according to the invention, a valve actuator set point and corresponding valve actuator setting is adjusted at increments of 80 ms. Even smaller time increments may be technologically feasible.

Where the machine learning model output to the controller is used to adjust VSD setting instead of, or in addition to, valve actuator setting, the VSD setting is typically adjusted less frequently than valve actuator setting. While the model output may update continuously, the VSDs setting may optimally change only one, two or several times per hour.

A second machine learning model may operate on telemetry data and production data from the well to produce a back-pressure set point. The back-pressure set point is set less frequently than the valve actuator set point and/or the pump frequency set point: e.g., daily, several times a day, at intervals of one or more hours or less than an hour.

The models are related but contain different computer program elements and run on different equipment. For example, the second model for determining back-pressure set point may be provided to an edge computing device from a cloud computing system, or the edge computing device may be programmed by an operator to manage a back-pressure set point based on a past (intuitive) experience. A first model may be provided to a controller for operation of the pump and valve parameters (e.g. drive frequency and percent valve open).

Thus, a novel and improved artificial lift system is described herein that is designed to address certain shortcomings of conventional ESP systems. This innovative system incorporates the dynamic optimization of well back pressure using novel pressure regulation hardware that allows continuous actuation of a back pressure valve while, in embodiments, also optimizing the speed of downhole motor for the ESP. In embodiments, the continuous control of back pressure valve actuation, provided for by a machine learning algorithm running a controller (such as a conventional PID controller) optimizes power consumption, enhances pump performance, and provides a more robust and versatile artificial lift system for oil, gas and water wells. FIG. 1 depicts the variation around a back pressure set point before and after installation of the continuously actuated valve. The data is from a real-world commercial oil well. The system described herein marks an advance in the ongoing evolution of artificial lift technologies and can pave the way for more efficient and sustainable extraction of hydrocarbon resources.

The ESP system as shown and described integrates software and/or hardware to control a physical restriction during the production phase of the well life cycle. An ESP system is one example of an artificial lift system. An ESP system may be used, for example, to bring hydrocarbons to the surface from an oil well or gas well or to bring water to the surface of a water well.

In accordance with an embodiment, the combination of hardware and software is connected in the following manner: (a) install necessary process piping to accept back pressure control device; (b) install valve, adaptor, and actuator; (c) install pressure transducer; (d) run power and communication wires to well head and actuator; (e) install programmable logic controller and human machine interface to communicate with valve and telemetry; and (f) program the programmable logic controller and display to automatically adjust valve position based on pressure and desired control mode.

The hardware used in the aforementioned ESP system with features for dynamic optimization of back pressure may be applicable to any flow control, pressure regulation or pressure control situation where equipment is controlled remotely.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or variable, but every embodiment may not necessarily include the particular feature, structure, or variable. Moreover, such phrases are not necessarily referring to the same embodiment. Further, when a particular feature, structure, or variable is described in connection with an embodiment, it would be within the knowledge of persons skilled in the relevant art(s) to incorporate such feature, structure, or variable into other embodiments whether or not explicitly mentioned or described herein. Likewise, a feature expressed in a dependent claim may be combined with or incorporated into any independent or dependent claim consistent with the disclosure herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The ten "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. An electric submersible pump (ESP) control system providing dynamic optimization of back pressure on a fluid well, comprising:

an ESP disposed in a wellbore of the fluid well and contacting well fluids thereof, a pump motor disposed in the wellbore configured to mechanically drive the ESP responsive to electrical power provided thereto to lift the well fluids to a surface of the fluid well;

a power cable that extends from the surface of the fluid well to the pump motor to provide the electrical power thereto;

a drive connected between a power source and the power cable and operable to vary electrical power provided to the pump motor via the power cable;

a wellhead at the surface of the fluid well configured to pass well fluids pumped from the fluid well to sales and/or storage via a flowline;

an actuated pressure control valve connected between the wellhead and the flowline that is operable to continuously vary a flow rate of the well fluids passing through the flowline;

a controller for the pressure control valve configured to control a degree open of the valve based on a valve actuator setting;

a pressure transducer that transmits pressure signals from the wellhead to the controller for the actuated pressure control valve; wherein the controller is configured to receive a pressure set point from a machine learning model output; receive pressure signals from a pressure transducer on the wellhead; and control a pressure control valve actuator setting continuously to minimize error around the pressure set point in accordance with the machine learning model; wherein the machine learning model comprises: a telemetry sub-model using telemetry data obtained from a plurality of sensors in communication with the ESP to produce an actuator setting; and a production sub-model using output from the telemetry sub-model and oil, gas and water production data from the well to produce back pressure set point values; and wherein the model is characterized by physical constraint parameters applied to predictions made by the telemetry model, wherein the constraint parameters limit optimization of predicted back pressure set points to values within defined boundaries, and wherein the constraint parameters are set manually or adjusted dynamically based on real-time well data.

2. The ESP system according to claim 1, wherein the pressure control valve actuator setting is adjusted automatically more than once per second according to the machine learning model provided to the controller.

3. The ESP system according to claim 1, wherein the controller is network connected and configured to receive a first machine learning model output for optimizing the pressure control valve actuator setting to minimize error around a pressure set point from an external computer.

4. The ESP system according to claim 3, wherein the controller is configured to receive the pressure set point from an edge computing device configured for network connectivity, and the edge computing device is configured to run a second machine learning model for optimizing the pressure set point.

5. The ESP system according to claim 4, wherein the edge computing device is configured for Internet connectivity and offline programming when connectivity is absent.

6. The ESP system according to claim 1, wherein said plurality of sensors is a plurality selected from the group consisting of: ESP run status sensor; ESP downhole current sensor; ESP downhole voltage sensor; DC bus voltage sensor; motor overload sensor; motor current sensor; motor underload sensor; motor voltage sensor; motor power sensor; motor speed sensor; motor temperature sensor; motor torque sensor; intake temperature sensor; intake pressure sensor; casing pressure sensor; discharge pressure sensor; discharge temperature sensor; vertical axis vibration sensor; and horizontal axis vibration sensor.

7. The ESP system according to claim 6, wherein the controller is configured to continuously and autonomously control a valve actuator setting to minimize error around a remotely provided back pressure set point;

the drive connected between the power source and the power cable operable to vary electrical power provided to the pump motor is a variable speed drive (VSD); and the controller is configured to continuously and autonomously control a variable speed drive (VSD) actuator in communication with the VSD to continuously and autonomously control a set pump frequency; and wherein the pump frequency, the valve actuator setting and signals from the pressure transducer are provided to an edge computing device.

8. An electric submersible pump (ESP) system providing dynamic optimization of back pressure on a fluid well, comprising:

an ESP disposed in a wellbore of the fluid well and contacting well fluids thereof;

a pump motor disposed in the wellbore configured to mechanically drive the ESP responsive to electrical power provided thereto to lift the well fluids to a surface of the fluid well;

a power cable that extends from the surface of the fluid well to the pump motor to provide the electrical power thereto;

a variable speed drive (VSD) connected between a power source and the power cable and operable to vary electrical power provided to the pump motor via the power cable;

a wellhead at the surface of the fluid well that is configured to pass well fluids pumped from the fluid well to sales and/or storage via a flowline;

an actuated pressure control valve connected between the wellhead and the flowline;

a controller for the VSD configured to control pump frequency based on a VSD setting;

a pressure transducer that transmits pressure signals from the wellhead to the controller for the VSD; wherein the controller is configured to receive a back pressure set point from a machine learning model output; receive pressure signals from a pressure transducer on the wellhead; and control the VSD setting at intervals based on the machine learning model output; wherein the controller is configured to receive the back pressure set point from an edge computing device configured for network connectivity, and the edge computing device is configured to run a machine learning model for optimizing the back pressure set point; and wherein the machine learning model comprises: a telemetry sub-model using telemetry data obtained from a plurality of sensors in communication with the ESP to produce a VSD set point; and a production sub-model using output from the telemetry sub-model and oil, gas and water production data from the well to produce a back pressure set point value; and wherein the machine learning model is characterized by inclusion of physical constraint parameters within which optimization of VSD setpoints occurs, wherein the constraint parameters ensure that predicted VSD set point settings remain within predefined operating limits for the system, and wherein the constraint parameters are set pre-programmed or adaptively adjusted based on the telemetry data.

9. The ESP system according to claim 8, wherein the VSD setting is adjusted automatically more than once per second according to the machine learning model output to the controller.

10. The ESP system according to claim 8, wherein the edge computing device is configured for Internet connectivity and offline programming when connectivity is absent.

11. The ESP system according to claim 8, wherein the plurality of sensors comprises a plurality selected from the group consisting of ESP run status sensor; ESP downhole current sensor; ESP downhole voltage sensor; DC bus voltage sensor; motor overload sensor; motor current sensor; motor underload sensor; motor voltage sensor;

motor power sensor; motor speed sensor; motor temperature sensor; motor torque sensor;

intake temperature sensor; intake pressure sensor; casing pressure sensor; discharge pressure sensor; discharge temperature sensor; vertical axis vibration sensor; and horizontal axis vibration sensor.

12. The ESP system according to claim 8, wherein well fluids comprise oil, water, and gas and flow rates of the oil, water, and gas are depicted on an interface.

13. The ESP system according to claim 8, wherein the back pressure set point is optimized with respect to oil flow rate; gas flow rate; water flow rate; failure rate;

downhole amperage; intake pressure drawdown; oil revenue; and/or gas revenue.

\* \* \* \* \*